United States Patent [19]

Dalrymple

[11] Patent Number: 5,146,986
[45] Date of Patent: Sep. 15, 1992

[54] METHODS OF REDUCING THE WATER PERMEABILITY OF WATER AND OIL PRODUCING SUBTERRANEAN FORMATIONS

[75] Inventor: E. Dwyann Dalrymple, Duncan, Okla.

[73] Assignee: Halliburton Company, Duncan, Okla.

[21] Appl. No.: 805,129

[22] Filed: Dec. 11, 1991

Related U.S. Application Data

[63] Continuation-in-part of Ser. No. 669,830, Mar. 15, 1991, abandoned.

[51] Int. Cl.⁵ .................. E21B 33/138; E21B 43/22; E21B 43/32
[52] U.S. Cl. .................. 166/294; 166/305.1; 252/8.551; 405/264
[58] Field of Search ............ 166/281, 294, 295, 305.1; 252/8.551; 405/264

[56] References Cited

U.S. PATENT DOCUMENTS

| | | | |
|---|---|---|---|
| 2,800,184 | 7/1957 | Meadors | 166/294 X |
| 3,127,345 | 3/1964 | De Groote et al. | 166/305.1 X |
| 3,148,199 | 9/1964 | De Groote et al. | 166/294 X |
| 3,189,090 | 6/1965 | Mitch et al. | 166/294 |
| 3,228,956 | 1/1966 | Monroe | 252/8.551 |
| 3,254,718 | 6/1966 | Dunlap . | |
| 3,343,599 | 9/1967 | Eddins, Jr. et al. | 166/294 |
| 3,343,602 | 9/1967 | Knox et al. . | |
| 3,404,734 | 10/1968 | Raifsnider et al. | 166/294 |
| 3,421,585 | 1/1969 | Garcia . | |
| 3,483,923 | 12/1969 | Darley | 166/271 |
| 3,568,772 | 3/1971 | Gogarty et al. | 166/273 |
| 3,719,228 | 3/1973 | Garcia | 166/281 |
| 3,923,100 | 12/1975 | Bellos et al. | 166/281 |
| 3,970,148 | 7/1976 | Jones et al. | 166/307 |
| 4,617,132 | 10/1986 | Dalrymple et al. | 252/8.554 |

*Primary Examiner*—George A. Suchfield
*Attorney, Agent, or Firm*—Thomas R. Weaver

[57] ABSTRACT

A method of reducing the water produced from a subterranean formation penetrated by a wellbore without appreciably reducing the oil produced therefrom is provided. In accordance with the method, the formation is contacted with a hydrocarbon treating solution having dissolved therein a surface active agent comprosed of one or more fatty acid imidazolyl compounds.

19 Claims, No Drawings

METHODS OF REDUCING THE WATER PERMEABILITY OF WATER AND OIL PRODUCING SUBTERRANEAN FORMATIONS

CROSS REFERENCE TO RELATED APPLICATION

This application is a continuation-in-part of my prior copending application Ser. No. 07/669,830 filed Mar. 15, 1991, now abandoned.

BACKGROUND OF THE INVENTION

1. Field of the Invention

The present invention relates generally to methods of reducing the water permeability of water and oil producing subterranean formations, and more particularly, to methods of reducing the water produced from such subterranean formations without appreciably reducing the oil produced therefrom.

2. Description of the Prior Art

The simultaneous production of water with oil and/or gas from oil and gas wells constitutes a major expense in the recovery of oil and gas from subterranean producing formations. Many oil wells produce very high volumes of water along with hydrocarbons, e.g., 80% or more of the total fluids produced can be and often is water. Energy is expended in producing the water, and thereafter, the water must be separated from the produced hydrocarbons and disposed of, all of which adds considerable costs to the production process.

A variety of techniques have been developed and used heretofore for reducing the quantity of water produced from oil and/or gas wells. For example, U.S. Pat. No. 3,719,228 issued Mar. 6, 1973, discloses a method of treating a subterranean formation containing hydrocarbons and brine to stimulate the production of the hydrocarbons without substantially increasing the production of brine. A preflush composition comprised of a water solution of rosin soap and fatty acid soap is injected into the formation. The preflush composition reacts with connate brine to produce a precipitate that blocks the brine-bearing passages, but the preflush composition does not react with hydrocarbons thereby allowing the hydrocarbon bearing passages to remain open.

U.S. Pat. No. 4,617,132 issued Oct. 14, 1986, discloses a method of reducing the permeability to water of a subterranean formation comprised of sandstone. The sandstone formation is contacted with an aqueous mixture containing a water soluble anionic polymer having a molecular weight greater than 100,000 followed by contacting the anionic polymer with a fluid containing a water soluble cationic polymer having a molecular weight greater than 1,000. As a result of the contact of the anionic polymer with the cationic polymer, coacervation occurs between the anionic and cationic polymers which reduces the amount of the anionic polymer removed from the formation by fluids produced therefrom. The presence of the stabilized polymer in the formation reduces the water/oil ratio of the produced fluids by reducing the permeability of the formation to water in the wellbore area.

While the methods and techniques utilized heretofore have achieved various degrees of success in reducing the water permeability of subterranean formations, there is a need for a method which does not involve the injection of water or aqueous chemical solutions into the subterranean formation to be treated. The injection of water or aqueous solutions often results in high water saturation near the wellbore which reduces the hydrocarbon productivity of the formation thereby offsetting the benefit of reducing the water productivity thereof.

The present invention meets the above mentioned need by providing an improved method of reducing the water permeability of a water and oil producing subterranean formation wherein the formation is contacted with a hydrocarbon solution of a composition which reduces the water permeability of the formation.

SUMMARY OF THE INVENTION

The present invention provides a method of reducing the water produced from a subterranean formation penetrated by a wellbore without appreciably reducing the oil produced therefrom. In accordance with the method, the formation is contacted with a hydrocarbon carrier liquid containing a surface active agent which consists of compositions selected from the group consisting of imidazoline compounds, amides and mixtures thereof. The surface active agent, which is dissolved in the hydrocarbon carrier liquid, is believed to adsorb on the walls of the interstitial passages in the subterranean formation as a result of which, the flow of water through the passages is reduced.

In a preferred method, a hydrocarbon liquid, having dissolved therein a treating agent comprised of a 25% by weight isopropanol solution of the preferred surface active agent of this invention, which is a mixture of imidazoline compounds and amides, is pumped into the formation to be treated by way of the wellbore. The treating agent is preferably present in the hydrocarbon solution in an amount in the range of from about 0.025% to about 1% by weight of the solution. The solution is pumped at a rate and pressure sufficient to cause the solution to flow outwardly from the wellbore into contact with a portion of the formation surrounding the wellbore without fracturing the formation. Once the formation has been contacted with the solution, the pumping is discontinued and the pressure on the formation is reduced whereby the formation is returned to production. The presence of the surface active agent in the portion of the formation surrounding the wellbore reduces the permeability of the formation to water, but does not reduce the permeability of the formation to hydrocarbon.

It is, therefore, a general object of the present invention to provide improved methods of reducing the water permeability of water and oil producing subterranean formations.

Other and further objects, features and advantages of the invention will be readily apparent to those skilled in the art upon a reading of the description of preferred embodiments which follows.

DESCRIPTION OF PREFERRED EMBODIMENTS

The present invention provides relatively simple and efficient methods of reducing the water produced from a subterranean formation penetrated by a wellbore without appreciably reducing the oil produced therefrom. The methods can be utilized in formations formed of a variety of materials including sandstone, limestone and dolomite.

In accordance with the invention, a formation to be treated is contacted with a surface active agent which reduces the water permeability of the formation without appreciably reducing the oil permeability. The surface active agent consists of compositions selected from the group consisting imidazoline compounds, amides and mixtures thereof. The imidazoline compounds useful herein are the fatty acid, oxyethyl derivatives of imidazole as defined by the general formula:

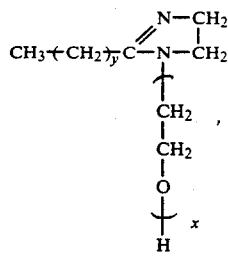

and mixtures thereof
wherein X is a number in the range of from about 1 to about 5, preferably 1; and Y is a number in the range of from about 2 to about 17, preferably 7 to 17. The preferred imidazoline compounds are mixtures of such compounds which are derived from a mixture of fatty acids selected from coconut oil (Y is in the range of from 7 to 17) and tallow (Y is in the range of from 11 to 17) and ethylene oxide (X is 2).

The amide compounds useful herein are the N-oxyethyl, N-aminoalkyl, fatty acid amides as defined by the general formula:

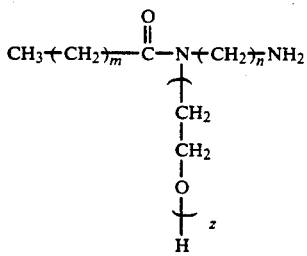

and mixtures thereof wherein Z is a number in the range of from about 1 to about 5, preferably 1; m is a number in the range of from about 2 to about 17, preferably 7 to 17; and n is a number in the range of from about 1 to 3, preferably 2. The preferred amide compounds are mixtures of such compounds which are derived from a mixture of fatty acids selected from coconut oil (m is in the range of from 7 to 17) and tallow (m is in the range of from 11 to 17); ethylene oxide (Z is 2); and ethane (n is 2).

The preferred treating agent is a 25% by weight isopropanol solution of the preferred surface active agent of this invention which is a mixture of compounds consisting essentially of 85 percent by weight of mono-oxyethyl, coco imidazoline and 15 percent by weight of N-mono-oxyethyl, N-aminoethyl, cocoamide.

The treating agent, while dissolved in a hydrocarbon carrier liquid, is introduced into the subterranean formation to be treated by way of a wellbore penetrating the formation. Any of a variety of hydrocarbon carrier liquids can be utilized, but particularly suitable carrier liquids are diesel oil, kerosene and crude oil. Of these, diesel oil is the most preferred.

The treating agent is dissolved in the hydrocarbon carrier liquid in the general amount of from about 0.0% to about 10% by weight of the resulting solution. Once formed, the hydrocarbon solution containing the treating agent is introduced into the subterranean formation by way of the wellbore whereby the formation is contacted with the hydrocarbon solution and the surface active agent is adsorbed on the surfaces of the formation.

A particularly preferred method of the present invention for reducing the water produced from a subterranean formation penetrated by a wellbore, without appreciably reducing the oil produced therefrom, comprises the steps of pumping into the formation by way of the wellbore, a hydrocarbon solution having dissolved therein a treating agent comprised of a 25% by weight isopropanol solution of the above described preferred surface active agent. The pumping is performed at a rate and pressure sufficient to cause the hydrocarbon solution to flow outwardly from the wellbore into contact with the surfaces of a portion of the formation surrounding the wellbore without fracturing the formation. The hydrocarbon liquid is preferably diesel oil, and it preferably contains the treating agent in an amount in the range of from about 0.025% to about 1.0% by weight of the solution. Once the hydrocarbon treating solution has been pumped into the formation, the pumping is discontinued and the pressure on the formation is reduced whereby the formation is returned to production.

The hydrocarbon liquid-treating agent solution can be formed in a batch mixing apparatus prior to pumping or on the fly as the pumping takes place. The particular quantity of hydrocarbon solution which is pumped into the formation depends on a variety of factors such as the depth of the particular formation to be treated, the type of material of which the formation is formed, the permeability of the formation, etc. Generally, the quantity of hydrocarbon solution pumped is in the range of from about 0.5 barrel to about 10 barrels per vertical foot of the formation being treated. Once the total quantity of hydrocarbon solution has been pumped into the formation without fracturing the formation, the pumping is discontinued and the pressure on the formation is reduced whereby the formation is returned to production and the hydrocarbon carrier liquid is recovered.

It is believed that the contact of the subterranean formation with the hydrocarbon liquid-treating agent solution causes at least a portion of the surface active agent to be adsorbed on the surfaces of flow passages within the formation. The presence of the surface active agent in such passages reduces the flow of water therethrough without appreciably reducing the flow of oil thereby reducing the water/oil ratio of the fluids produced from the formation.

In order to further illustrate the methods of the present invention, the following example is given.

EXAMPLE 1

A berea sandstone core having a diameter of 2.5 cm and a length of 9.7 cm was tested to determine its permeability before and after treatment in accordance with the present invention. The test consisted of the following steps:

(1) A synthetic brine was pumped through the core by way of a first end thereof until a constant flow rate was achieved. The synthetic brine was an aqueous solution comprised of sodium chloride in an amount of 9% by weight of the solution and calcium chloride in an amount of 1% by weight of the solution.

(2) Kerosene was next pumped through the core by way of the first end thereof until a constant flow rate was achieved.

(3) A Kerosene solution having 0.02% of a treating agent dissolved therein was pumped through the core by way of the second opposite end of the core until 100 ml of solution was pumped through the core. The treating agent used consisted of a 25% by weight isopropanol solution of the previously described preferred surface active agent which is a mixture of compounds consisting essentially of 85 percent by weight of mono-oxyethyl, coco imidazoline and 15 percent by weight of N-mono-oxyethyl, N-aminoethyl, cocoamide.

(4) The synthetic brine described above was again pumped through the core by way of the first end thereof until a constant flow rate was achieved.

(5) Kerosene was then again pumped through the core by way of the first end thereof until a constant flow rate was achieved.

The brine and kerosene permeabilities before and after the treatment utilizing kerosene having 0.02% by weight surface active agent dissolved therein were calculated from the test results as follows:

| | |
|---|---|
| Initial Brine Permeability | 132.8 md |
| Initial Kerosene Permeability | 201.9 md |
| Brine Permeability After Treatment | 32.9 md |
| Kerosene Permeability After Treatment | 201.2 md |

From the above it can be seen that the method of the present invention effectively reduced the brine permeability of the formation core sample without appreciably reducing the kerosene permeability thereof.

EXAMPLE 2

A second berea sandstone core having a diameter of 2.5 cm and a length of 9.7 cm was tested as follows:

(1) The synthetic brine solution described in Example 1 above was pumped through the core by way of a first end thereof until a constant flow rate was achieved. Based on the flow rate, the initial permeability to the synthetic brine was determined to be 139.8 md.

(2) The core was treated with 5.2 ml of kerosene solution containing 0.2% by weight of the treating agent described in Example by pumping the kerosene solution through the core by way of the second end thereof.

(3) An additional large volume of the synthetic brine described above was pumped through the core by way of the first end thereof, and the brine permeability of the core was determined at intervals during the pumping. The results of these tests are set forth below.

| Volume of Brine Pumped after Treatment, ml. | Brine Permeability of the Core, md. |
|---|---|
| 200 | 46.7 |
| 400 | 46.8 |
| 800 | 44.9 |
| 1200 | 37.5 |
| 1600 | 37.1 |
| 2000 | 36.2 |

As shown in the above table, the brine permeability of the core remained relatively constant during the test indicating that the surface active agent is very resistant to wash off.

EXAMPLE 3

The method of the present invention was performed on a well completed in the Mississippi formation (a dolomitic formation). The height of the treated production zone was approximately 8 feet and the bottom hole temperature was 100° F. The production zone was contacted with 500 gallons of diesel oil containing 2 gallons of the treating agent described in Example 1 by pumping the diesel oil-treating agent solution into the zone under matrix rate and pressure conditions. The well production before the treatment was about 9 barrels of oil per day and 100 barrels of water per day. After the treatment, the well produced about 18 barrels of oil per day and 70 barrels of water per day.

Thus, the present invention is well adapted to carry out the objects and attain the ends and advantages mentioned as well as those which are inherent therein. While numerous changes and modifications to the invention will become apparent to those skilled in the art in view of the foregoing description, such changes are encompassed within the spirit of this invention as defined by the scope of the appended claims.

What is claimed is:

1. A method of treating a water and oil producing subterranean formation to selectively reduce the water permeability thereof consisting essentially of contacting said formation with a solution of a hydrocarbon carrier liquid and a treating agent, said treating agent being comprised of a surface active agent consisting of compounds selected from the group consisting of imidazoline compounds, amides and mixtures thereof, wherein said imidazoline compounds are the fatty acid, oxyethyl derivatives of imidazole and said amides are N-oxyethyl, N-aminoalkyl, fatty acid amides.

2. The method of claim 1 wherein said hydrocarbon carrier liquid is selected from the group consisting of kerosene, diesel oil and crude oil.

3. The method of claim 1 wherein said treating agent is present in said hydrocarbon carrier liquid in an amount in the range of from about 0.01% to about 10.0% by weight of said hydrocarbon carrier liquid and said treating agent.

4. The method of claim 1 wherein said hydrocarbon carrier liquid is diesel oil.

5. The method of claim 4 wherein said treating agent is a solution consisting of said surface active agent and 25% isopropanol by weight of said solutions.

6. The method of claim 5 wherein said treating agent is present in said hydrocarbon carrier liquid in an amount in the range of from about 0.025% to about 1.0% by weight of hydrocarbon carrier liquid and said surface active agent is a mixture said imidazoline compounds and said amides wherein said imidazoline compounds are derived from fatty acids selected from coconut oil and tallow and mixtures thereof and said amides are also derived from fatty acids selected from coconut oil and tallow and mixtures thereof.

7. A method of reducing the water produced from a subterranean formation penetrated by a wellbore without appreciably reducing the oil produced therefrom comprising the steps of:

pumping a hydrocarbon solution of a hydrocarbon carrier liquid and a treating agent into said formation by way of said wellbore, said treating agent being comprised of a surface active agent consisting of compounds selected from the group consisting of imidazoline compounds amides and mixtures thereof;

and then discontinuing said pumping and returning said formation to production, wherein said imidazoline compounds are defined by the general formula (1)

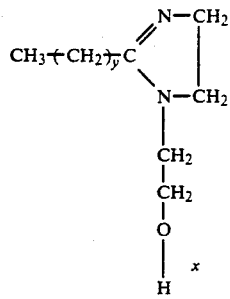

and mixtures thereof
wherein X is a number in the range of from about 1 to about 5 and Y is a number in the range of from about 2 to about 17 and
wherein said amides are defined by the general formula (2)

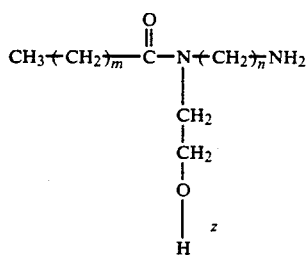

and mixtures thereof
wherein Z is a number in the range of from about 1 to about 5, m is a number in the range of from about 2 to about 17 and n is a number in the range of 1 to 3.

8. The method of claim 7 wherein said pumping of said hydrocarbon solution is at a rate and pressure sufficient to cause said solution to flow outwardly from said wellbore into contact with surfaces in said formation without fracturing said formation.

9. The method of claim 8 wherein said hydrocarbon carrier liquid is selected from the group consisting of kerosene, diesel oil and crude oil.

10. The method of claim 9 wherein said treating agent is present in said hydrocarbon solution in an amount in the range of from about 0.01% to about 10.0% by weight of said hydrocarbon solution.

11. The method of claim 9 wherein said hydrocarbon carrier liquid is diesel oil.

12. The method of claim 11 wherein said treating agent is a 25% by weight isopropanol solution of said surface active agents.

13. The method of claim 12 wherein said treating agent is present in said hydrocarbon solution in an amount in the range of from about 0.025% to about 1.0% by weight of said hydrocarbon solution, and wherein said general formula (1) X is 2 and Y is in the range of from about 7 to about 17 and wherein said general formula (2) Z is 2, m is in the range of from about 7 to about 17 and n is 2.

14. A method of reducing the water produced from a subterranean formation penetrated by a wellbore without appreciably reducing the oil produced therefrom comprising the steps of:

forming a hydrocarbon solution having a treating agent dissolved therein;

pumping said hydrocarbon solution into said formation by way of said wellbore, said pumping being at a rate and pressure sufficient to cause said solution to flow outwardly from said wellbore into contact with surfaces in said formation without fracturing said formation; and then discontinuing said pumping and reducing the pressure on said formation whereby said formation is returned to production, wherein said treating agent consists of a solution of a surface active agent and 25% isopropanol by weight of said treating agent and said surface active agent is a mixture of compounds consisting essentially of 85 percent by weight mono-oxyethyl coco imidazoline and 15 percent by weight N-mono-oxyethyl, N-amino ethyl cocoamide.

15. The method of claim 14 wherein the hydrocarbon in said hydrocarbon solution is selected from the group consisting of kerosene, diesel oil and crude oil.

16. The method of claim 15 wherein said hydrocarbon is diesel oil.

17. The method of claim 15 wherein said treating agent is present in said hydrocarbon solution in an amount in the range of from about 0.01% to about 10.0% by weight of said hydrocarbon solution.

18. The method of claim 17 wherein said treating agent is present in said hydrocarbon solution in an amount in the range of from about 0.025% to about 1.0% by weight of said hydrocarbon solution.

19. The method of claim 18 wherein said subterranean formation is formed of sandstone, limestone or dolomite.

* * * * *

UNITED STATES PATENT AND TRADEMARK OFFICE
CERTIFICATE OF CORRECTION

PATENT NO. : 5,146,986
DATED : September 15, 1992
INVENTOR(S) : E. Dwyann Dalrymple It is certified that error appears in the above-identified patent and that said Letters Patent is hereby corrected as shown below:

In column 3, line 66, delete (0.0%) and insert therefore -- 0.01% --.

In column 5, line 46, delete (Example) and insert therefore -- Example 1 --.

In column 7, line 13, delete ( | ) and insert therefore -- ↑ --.

In column 7, line 18, delete ( | ) and insert therefore -- ψ --.

In column 7, line 32, delete ( | ) and insert therefore -- ↑ --.

In column 7, line 36, delete ( | ) and insert therefore -- ψ --.

Signed and Sealed this

Eleventh Day of January, 1994

Attest:

BRUCE LEHMAN

*Attesting Officer*  *Commissioner of Patents and Trademarks*